United States Patent
Song et al.

(10) Patent No.: US 11,184,893 B2
(45) Date of Patent: Nov. 23, 2021

(54) METHOD FOR CONFIGURING COMMON SEARCH SPACE IN WIRELESS COMMUNICATION SYSTEM AND APPARATUS THEREFOR

(71) Applicant: LG Electronics Inc., Seoul (KR)

(72) Inventors: Huayue Song, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 16/483,632

(22) PCT Filed: Feb. 5, 2018

(86) PCT No.: PCT/KR2018/001514
§ 371 (c)(1),
(2) Date: Aug. 5, 2019

(87) PCT Pub. No.: WO2018/143748
PCT Pub. Date: Aug. 9, 2018

(65) Prior Publication Data
US 2020/0037323 A1     Jan. 30, 2020

Related U.S. Application Data

(60) Provisional application No. 62/454,875, filed on Feb. 5, 2017, provisional application No. 62/476,714, filed on Mar. 24, 2017.

(51) Int. Cl.
*H04W 72/04* (2009.01)
(52) U.S. Cl.
CPC ..... *H04W 72/0453* (2013.01); *H04W 72/042* (2013.01)
(58) Field of Classification Search
CPC ................ H04W 72/0453; H04W 72/042
See application file for complete search history.

(56) References Cited

U.S. PATENT DOCUMENTS

| 2013/0114529 A1* | 5/2013 | Chen | H04L 1/1829 370/329 |
| 2015/0181577 A1* | 6/2015 | Moulsley | H04W 72/042 370/329 |

(Continued)

FOREIGN PATENT DOCUMENTS

WO    2013-067266 A1    5/2013

OTHER PUBLICATIONS

Huawei et al., "Discussion on Search Design for DL Control Channels", R1 -1611211, 3GPP TSG RAN WG1 Meeting #87, Reno, USA, Nov. 5, 2016.

(Continued)

*Primary Examiner* — Donald L Mills
(74) *Attorney, Agent, or Firm* — Dentons US LLP

(57) ABSTRACT

The present specification provides a method for configuring a common search space (CSS) in a wireless communication system. Specifically, a method performed by a network may comprise the steps of: acquiring, from at least one terminal, information on a bandwidth of the at least one terminal; determining a particular subband indicating a bandwidth unit available for communication with the terminal; determining the number of particular subbands on the basis of the determined particular subband and the acquired information on the bandwidth of the terminal; and mapping, on the basis of the determined number of particular subbands and the aggregation level of the CSS, a part of the aggregation level to each particular subband. Therefore, it is possible to efficiently use radio resources through the CSS configuration method proposed in the present specification.

12 Claims, 17 Drawing Sheets

(56) References Cited

U.S. PATENT DOCUMENTS

| | | | |
|---|---|---|---|
| 2015/0382329 A1* | 12/2015 | Frenne | H04W 72/044 |
| | | | 370/329 |
| 2017/0318563 A1* | 11/2017 | Yang | H04L 5/0032 |
| 2019/0281539 A1* | 9/2019 | Takeda | H04L 5/0053 |
| 2019/0289668 A1* | 9/2019 | He | H04L 5/0098 |
| 2019/0349170 A1* | 11/2019 | Li | H04L 5/0094 |
| 2019/0394751 A1* | 12/2019 | Park | H04W 72/042 |
| 2020/0107245 A1* | 4/2020 | Takeda | H04W 48/12 |
| 2020/0221426 A1* | 7/2020 | Lee | H04W 72/04 |
| 2020/0245351 A1* | 7/2020 | Takeda | H04W 72/04 |

OTHER PUBLICATIONS

Zeid, Mohamed S. Abo et al., "Efficient Design and Implementation of LTE Downlink Control Information Decoder", International Journal of Computer Theory and Engineering, vol. 6, No. 2, Apr. 2, 2014.

Nokia et al., "On Design of Search Space for Short PDCCH", R1-1612211, 3GPP TSG RAN WG1 Meeting #87, Reno, USA, Nov. 4, 2016.

CATT, "Initial Views on DL Control Seach Space", R1-1611393, 3GPP TSG RAN WG1 Meeting #87, Reno, USA, Nov. 5, 2016.

* cited by examiner

[Figure 1]
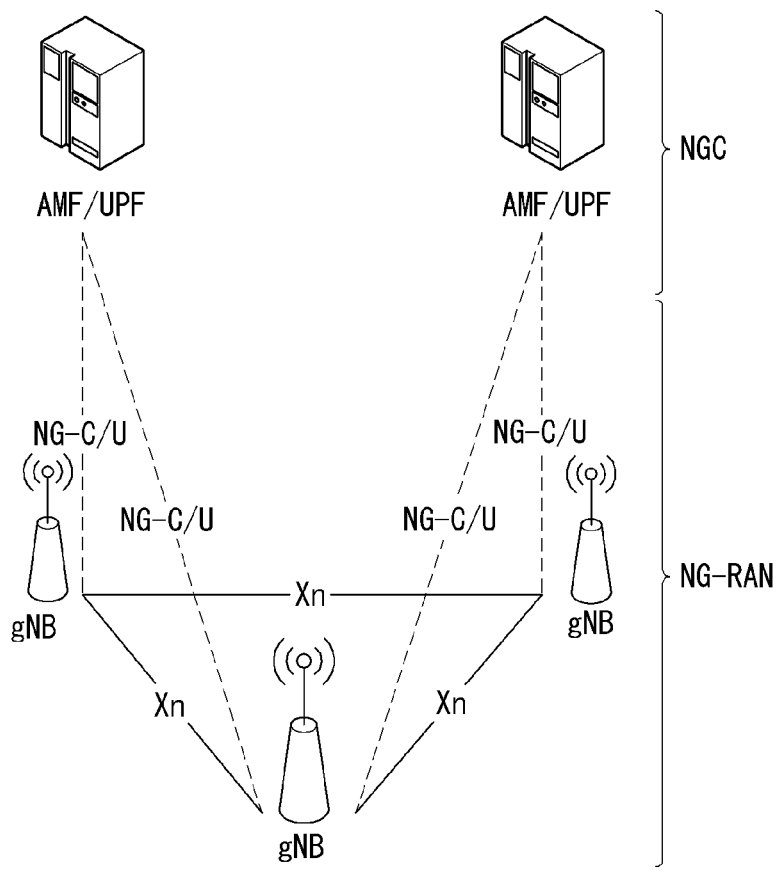
[Figure 2]
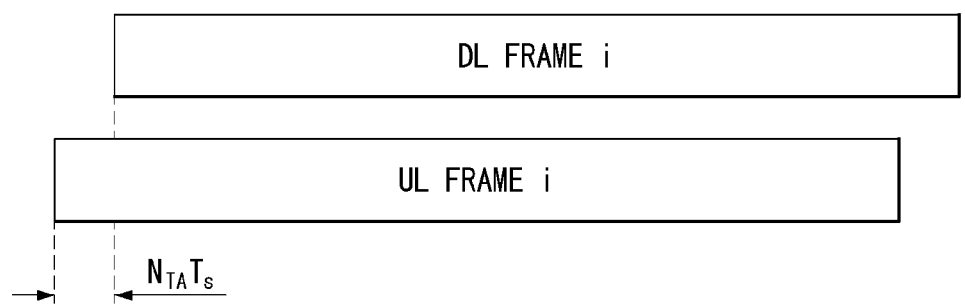

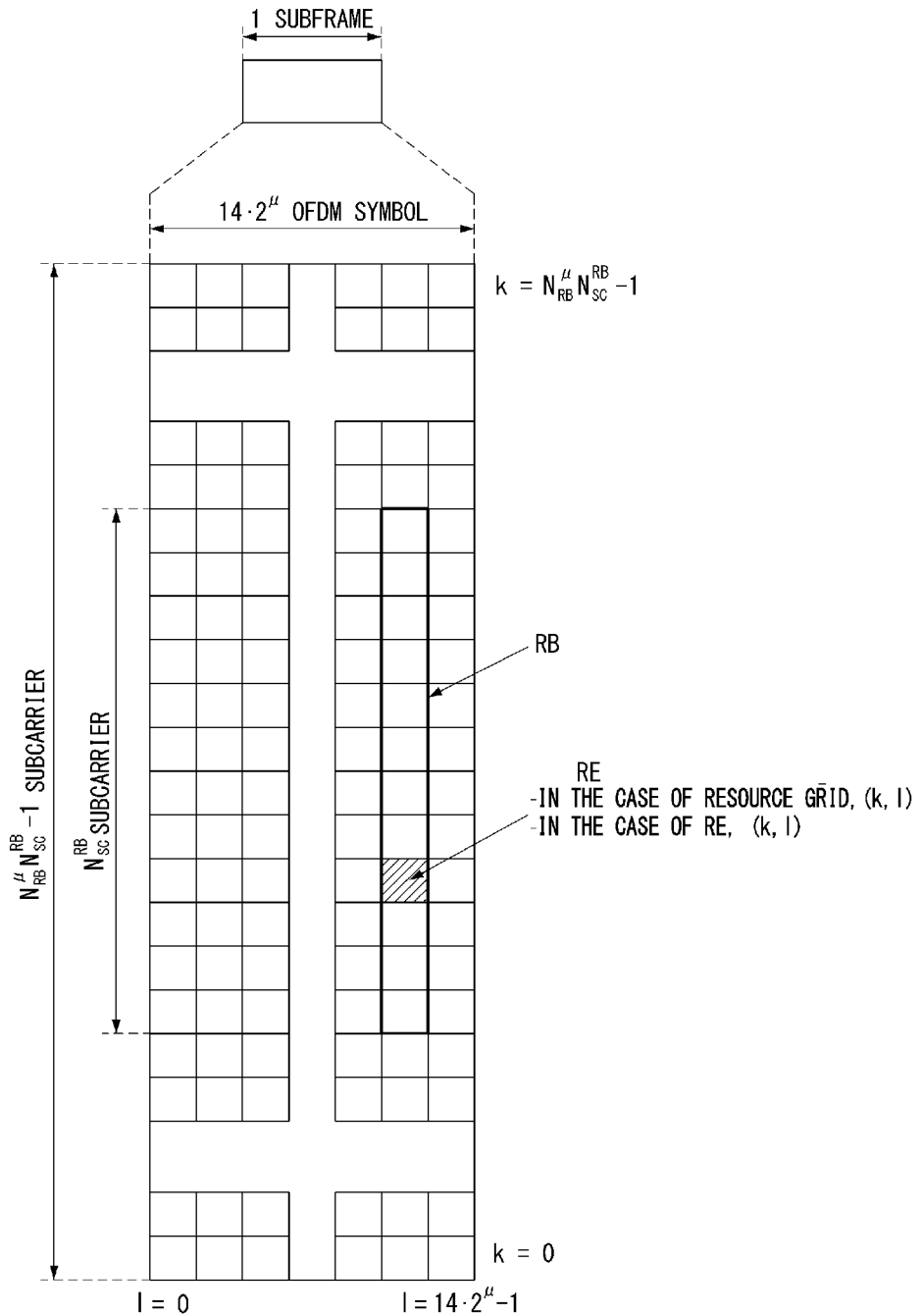
[Figure 3]

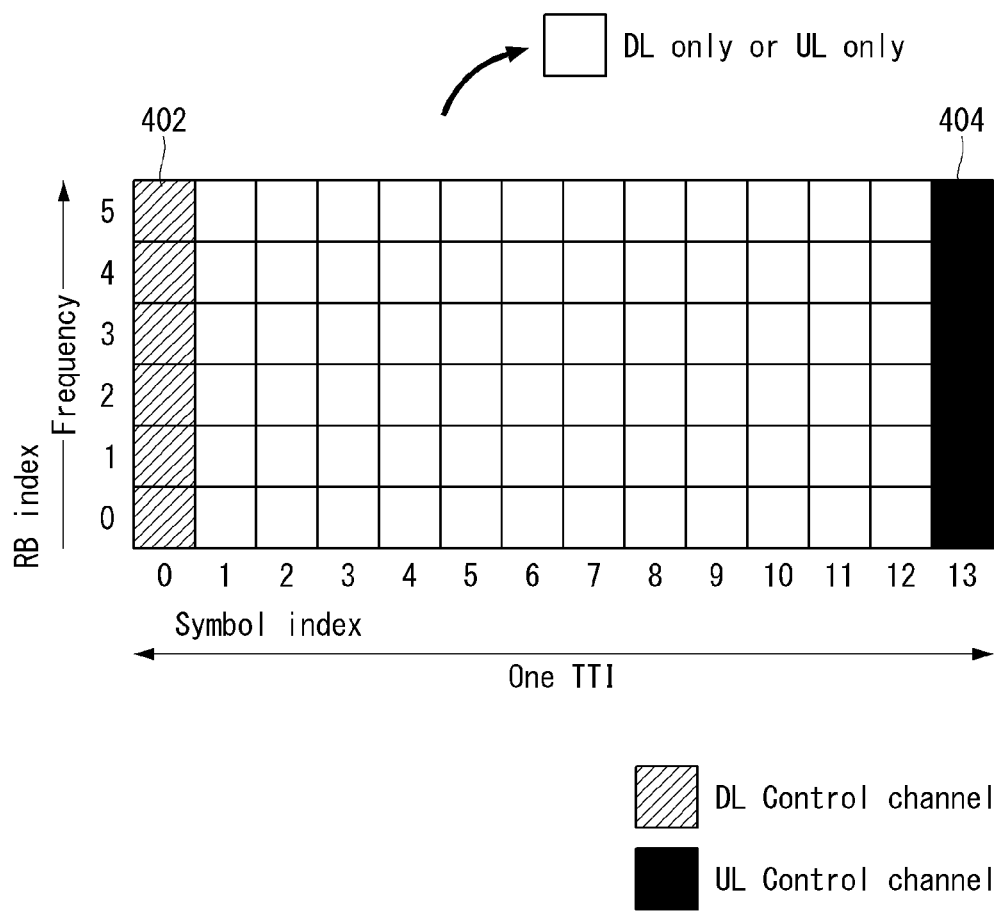
[Figure 4]

[Figure 5]
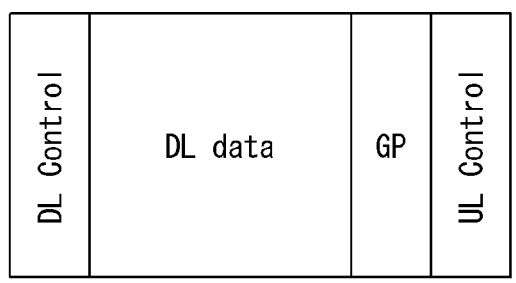
(a)
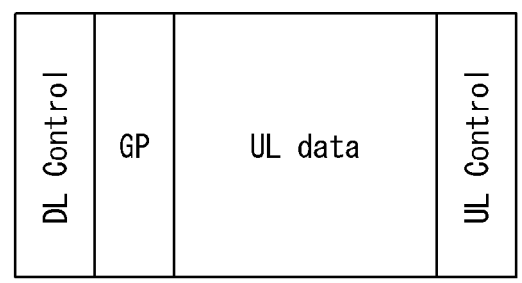
(b)
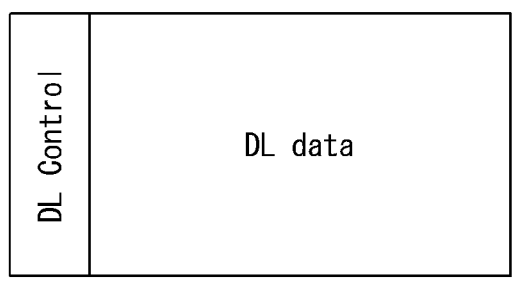
(c)
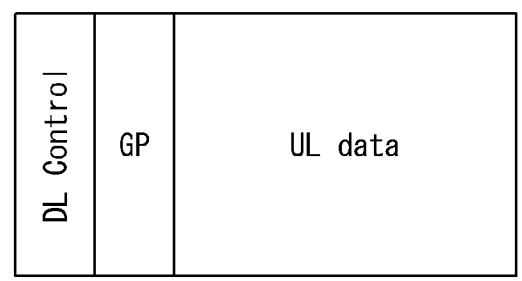
(d)

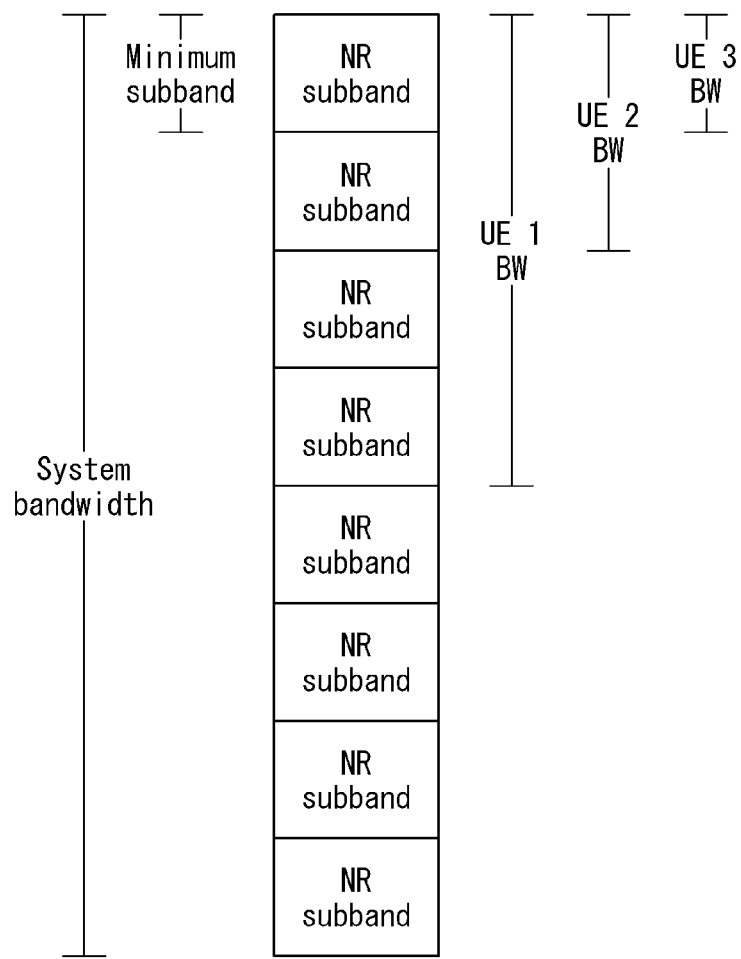
[Figure 6]

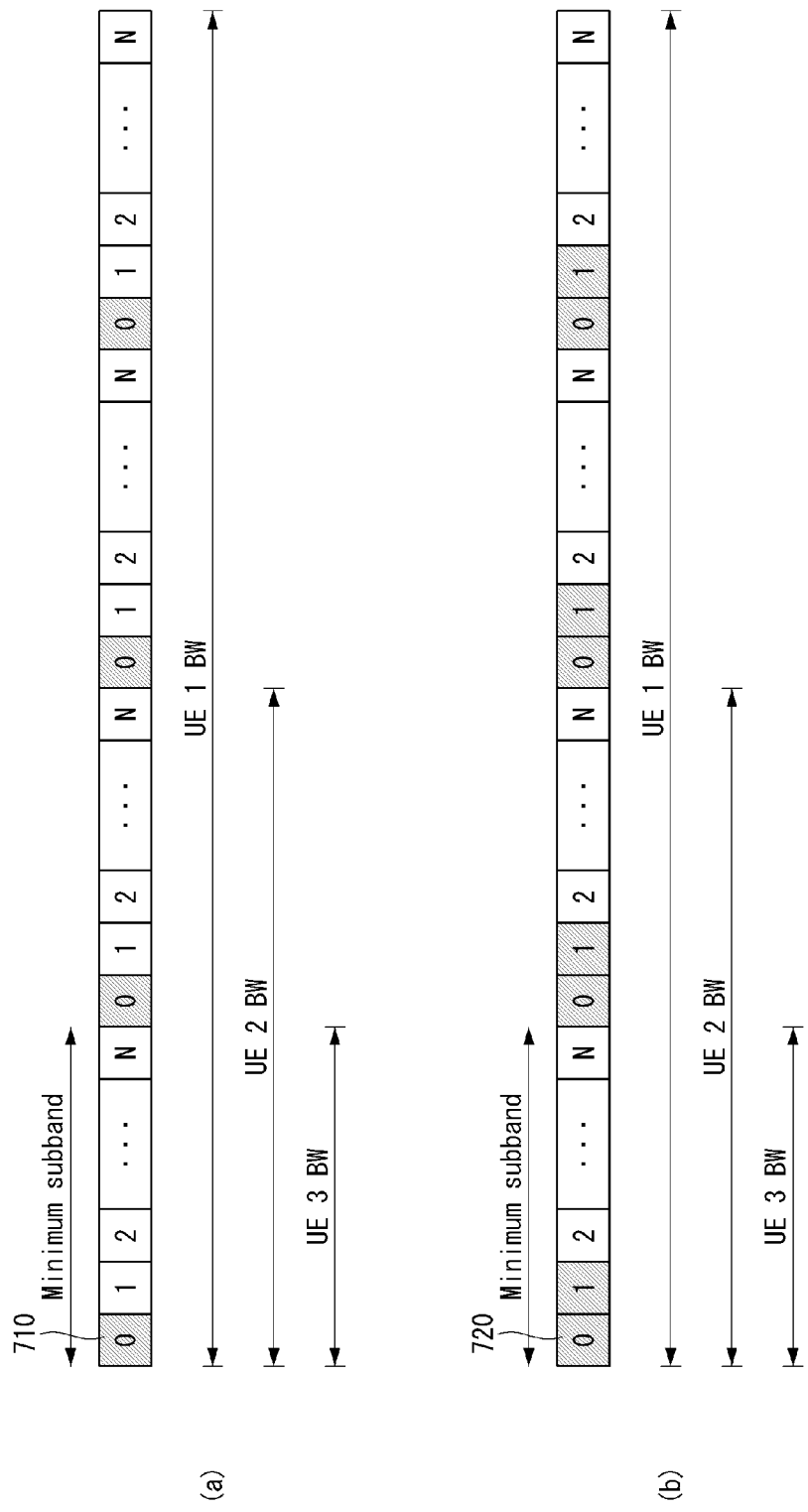
[Figure 7]

[Figure 8]
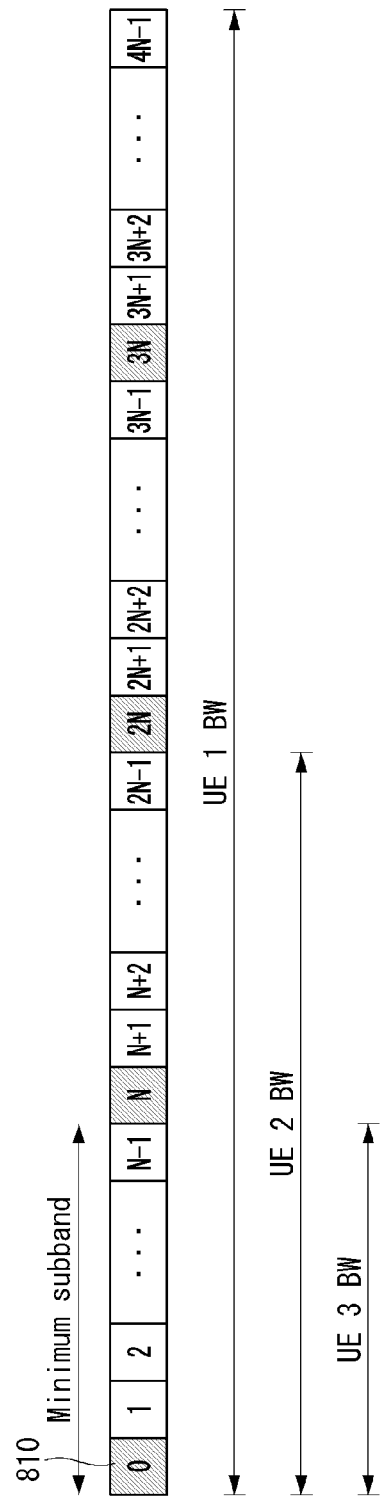

[Figure 9]
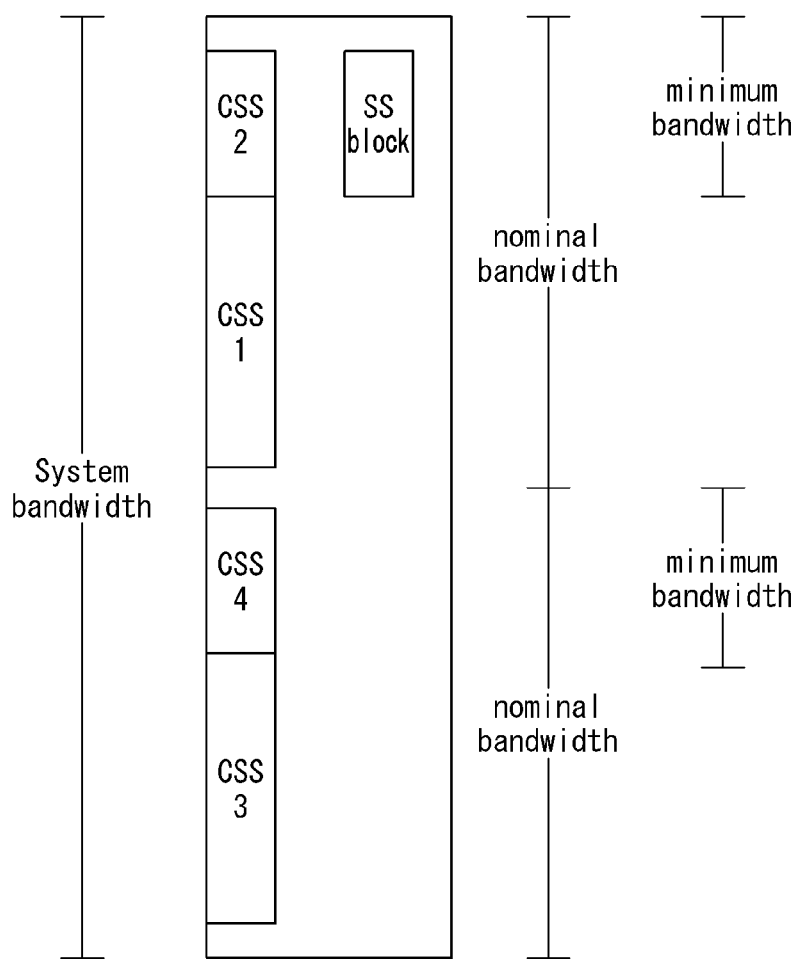

[Figure 10]
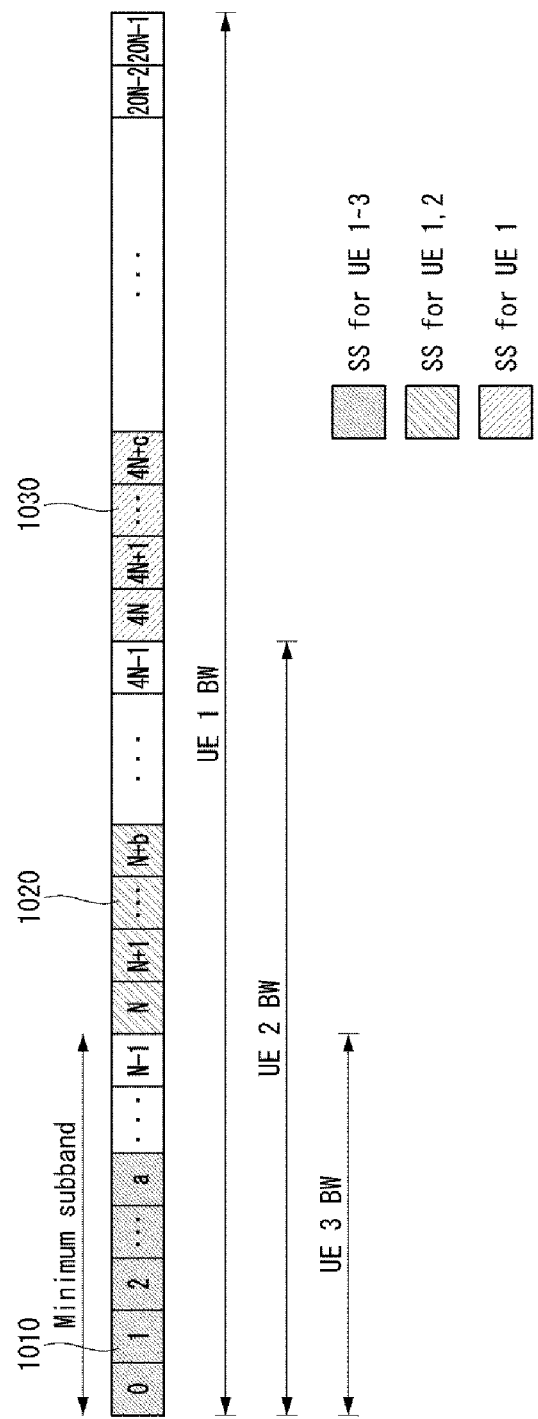

[Figure 11]
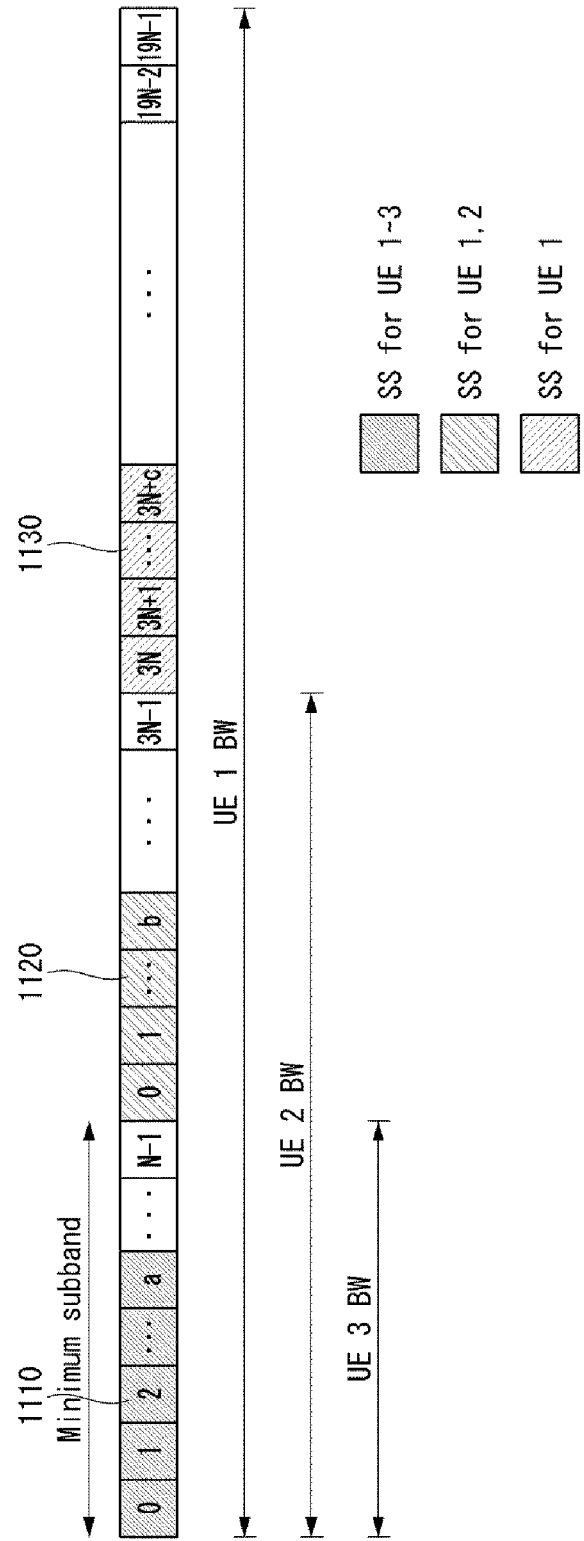

[Figure 12]
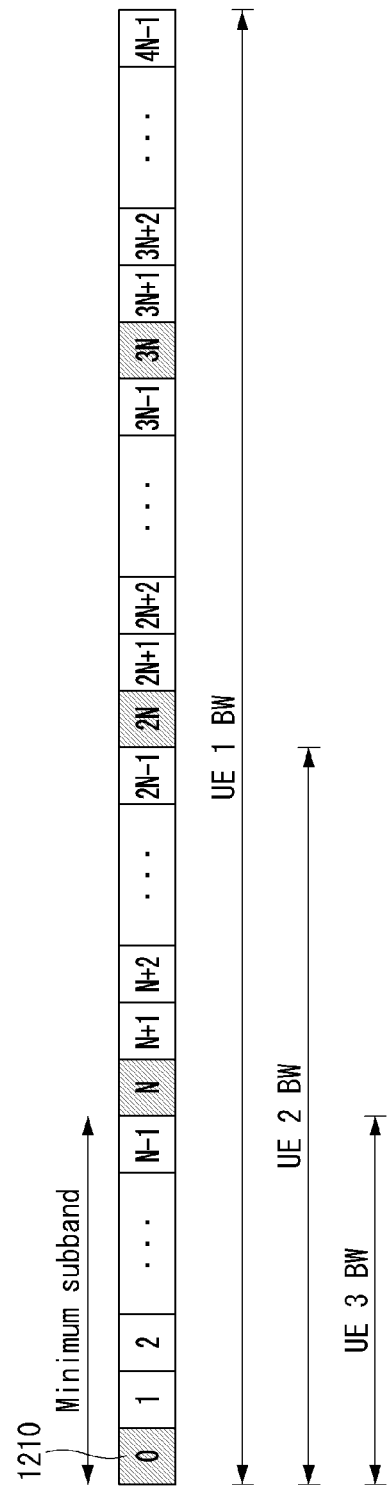

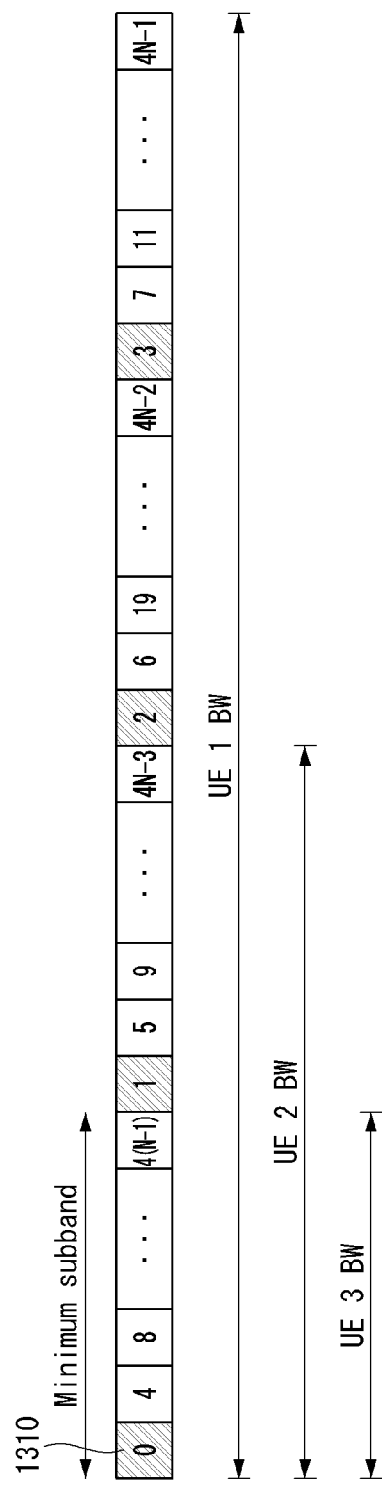
[Figure 13]

[Figure 14]
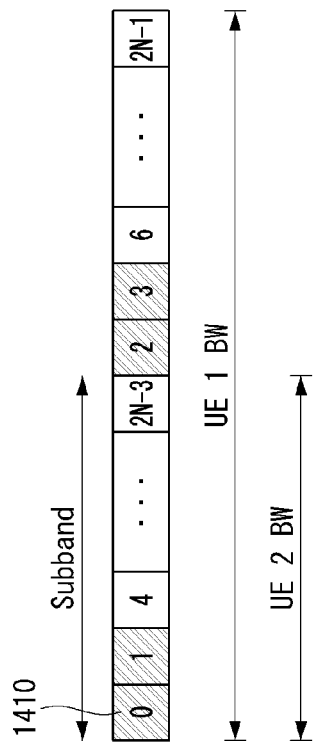
(b) CCE indexing in UE1' view
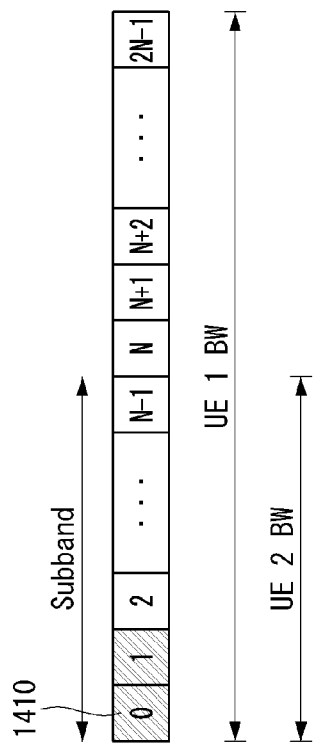
(a) CCE indexing in UE2' view

[Figure 15]

| aggregation level | system BW | subband index | | | | |
|---|---|---|---|---|---|---|
| | | CCE index (indexing method can be changed) | subband 0 (0-9) | subband 1 (0-9) | subband 2 (0-9) | subband 3 (0-9) |
| | span 1 subband | All UEs with different number of subband | | | Not exist | Not exist |
| system aggregation level 4 | span 2 subbands | All UEs except the UE with 1 subband | | | | Not exist |
| | | UE with 1 subband | | | | |
| | span 4/8 subbands | UE with 8 subband | | | | |
| | | UE with 4 subband | | | | |
| | | UE with 2 subband | | | | |
| | | UE with 1 subband | | | | |

| aggregation level | system BW | subband index | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| | | CCE index (indexing method can be changed) | \multicolumn{10}{c|}{subband 0} | \multicolumn{10}{c|}{subband 1} | \multicolumn{10}{c|}{subband 2} | \multicolumn{10}{c|}{subband 3} |
| system aggregation level 8 | span 1 subband | All UEs with different number of subband | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| | span 2 subbands | All UEs except the UE with 1 subband | | | | | | | | | | | | | | | | | | | | | Not exist | | | | | | | | | | | | | | | | | | |
| | | UE with 1 subband | | | | | | | | | | | | | | | | | | | | | | | | | | | | | | | | | | | | | | | | |
| | span 4 subbands | UE with 8 subband | | | | | | | | | | | | | | | | | | | | | | | | | | | | | | | | | | | | | | | | |
| | | UE with 4 subband | | | | | | | | | | | | | | | | | | | | | | | | | | | | | | | | | | | | | | | | |
| | | UE with 2 subband | | | | | | | | | | | | | | | | | | | | | | | | | | | | | | | | | | | | | | | | |
| | | UE with 1 subband | | | | | | | | | | | | | | | | | | | | | | | | | | | | | | | | | | | | | | | | |
| | span 8 subbands | UE with 8 subband | | | | | | | | | | | | | | | | | | | | | | | | | | | | | | | | | | | | | | | | |
| | | UE with 4 subband | | | | | | | | | | | | | | | | | | | | | | | | | | | | | | | | | | | | | | | | |
| | | UE with 2 subband | | | | | | | | | | | | | | | | | | | | | | | | | | | | | | | | | | | | | | | | |
| | | UE with 1 subband | | | | | | | | | | | | | | | | | | | | | | | | | | | | | | | | | | | | | | | | |
| | | subband index | \multicolumn{10}{c|}{subband 4} | \multicolumn{10}{c|}{subband 5} | \multicolumn{10}{c|}{subband 6} | \multicolumn{10}{c|}{subband 7} |
| | span 1 subband | All UEs with different number of subband | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| | span 2 subbands | All UEs except the UE with 1 subband | | | | | | | | | | | | | | | | | | | | | Not exist | | | | | | | | | | | | | | | | | | |
| | | UE with 1 subband | | | | | | | | | | | | | | | | | | | | | | | | | | | | | | | | | | | | | | | | |
| | span 4 subbands | UE with 8 subband | | | | | | | | | | | | | | | | | | | | | | | | | | | | | | | | | | | | | | | | |
| | | UE with 4 subband | | | | | | | | | | | | | | | | | | | | | | | | | | | | | | | | | | | | | | | | |
| | | UE with 2 subband | | | | | | | | | | | | | | | | | | | | | | | | | | | | | | | | | | | | | | | | |
| | | UE with 1 subband | | | | | | | | | | | | | | | | | | | | | | | | | | | | | | | | | | | | | | | | |
| | span 8 subbands | UE with 8 subband | | | | | | | | | | | | | | | | | | | | | | | | | | | | | | | | | | | | | | | | |
| | | UE with 4 subband | | | | | | | | | | | | | | | | | | | | | | | | | | | | | | | | | | | | | | | | |
| | | UE with 2 subband | | | | | | | | | | | | | | | | | | | | | | | | | | | | | | | | | | | | | | | | |
| | | UE with 1 subband | | | | | | | | | | | | | | | | | | | | | | | | | | | | | | | | | | | | | | | | |

1610

[Figure 17]
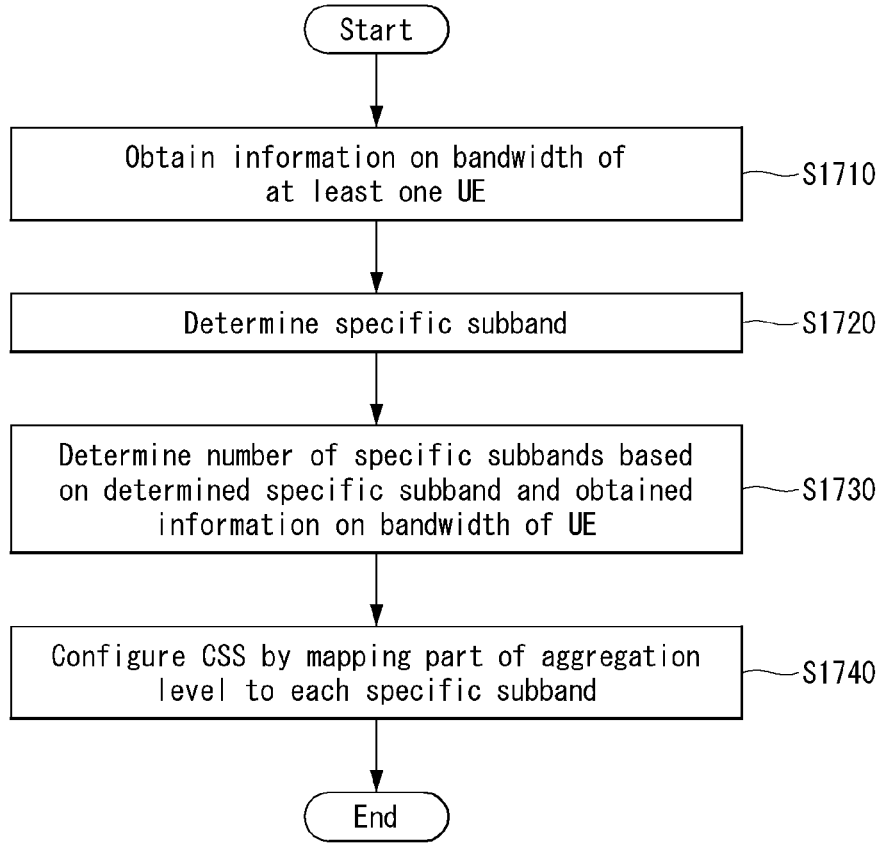
[Figure 18]
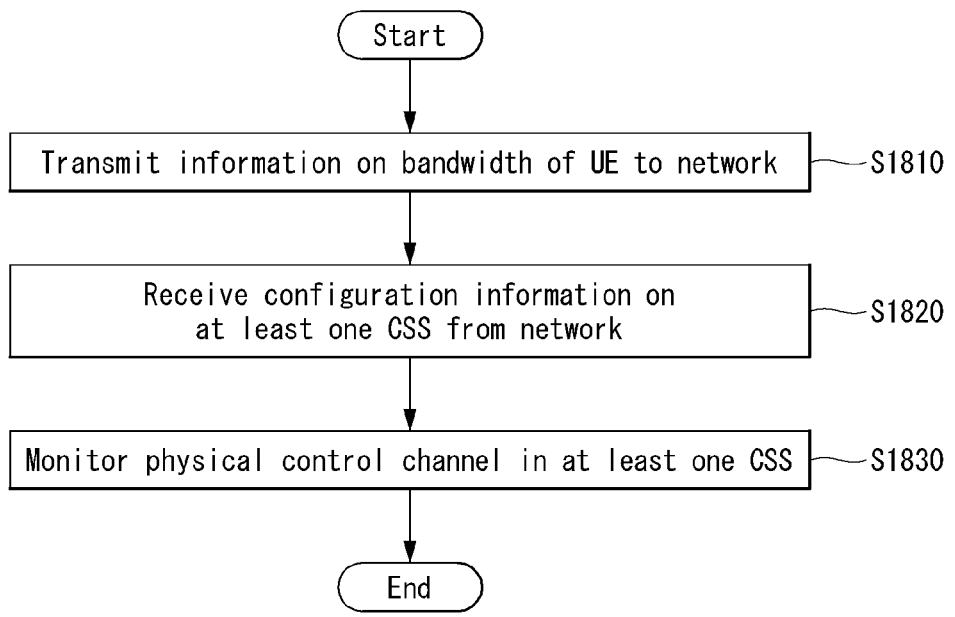

[Figure 19]
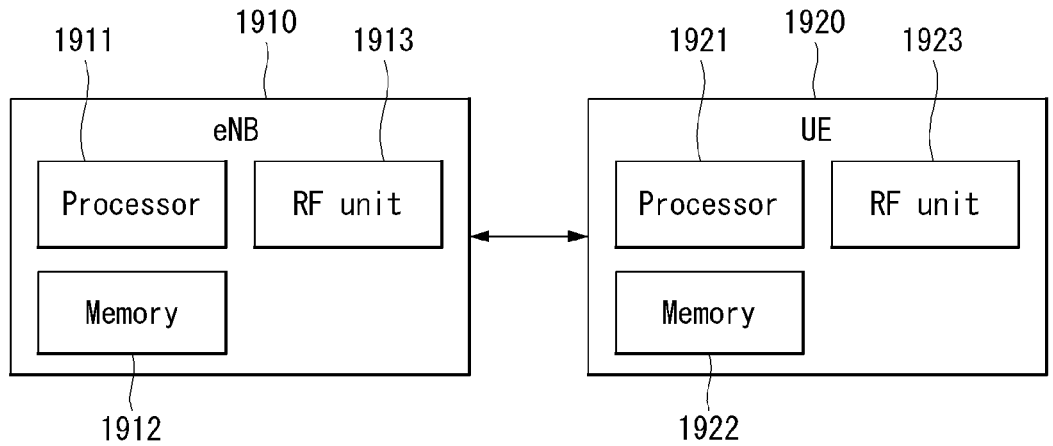
[Figure 20]
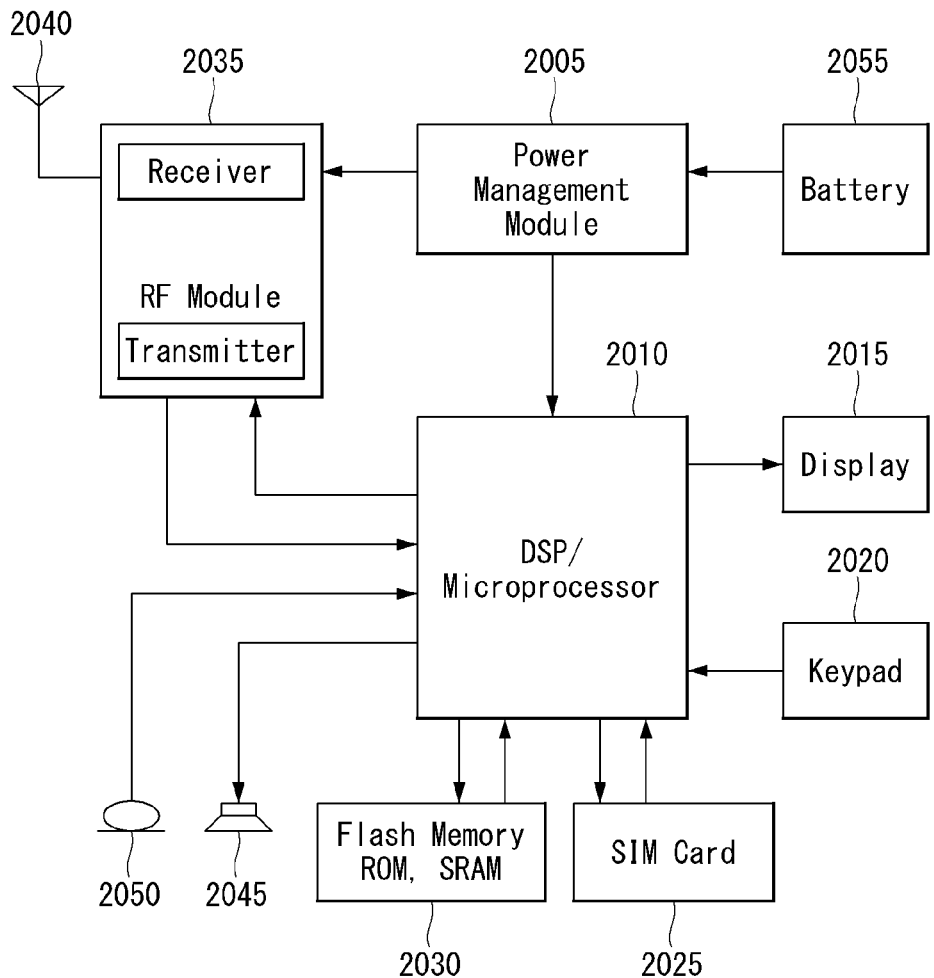

METHOD FOR CONFIGURING COMMON SEARCH SPACE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/001514, filed on Feb. 5, 2018, which claims the benefit of U.S. Provisional Application No. 62/454,875 filed on Feb. 5, 2017 and U.S. Provisional Application No. 62/476,714 filed on Mar. 24, 2017, the contents of which are all hereby incorporated by reference herein in their entirety.

TECHNICAL FIELD

This specification relates to a wireless communication system and, more particularly, to a method for configuring a common search space (CSS) and an apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification provides a CSS configuration method for efficiently using a radio resource if UEs having various RF bands are present in a wireless communication system.

Furthermore, this specification provides an indexing method for a CCE and an REG in a control resource region or a control resource set.

Technical objects to be achieved in the present invention are not limited to the aforementioned object, and those skilled in the art to which the present invention pertains may evidently understand other technological objects from the following description.

Technical Solution

This specification provides a method of configuring a common search space (CSS) in a wireless communication system.

Specifically, the method performed by a network obtaining information on a bandwidth of at least one user equipment (UE) from the at least one UE, determining a specific subband indicating a unit of a bandwidth capable of communication with the UE, determining the number of specific subbands based on the determined specific subband and the obtained information on the bandwidth of the UE, and mapping a part of an aggregation level to each specific subband based on the determined number of specific subbands and the aggregation level of the CSS.

Furthermore, the method further includes allocating at least one control resource set to the at least one UE and configuring a different CSS for each control resource set. Resource element group (REG)-control channel element (CCE) mapping is performed for each control resource set.

Furthermore, in this specification, the part of the aggregation level is mapped to a specific control channel element (CCE) of each specific subband.

Furthermore, in this specification, the specific subband corresponds to the bandwidth of a UE supporting the smallest bandwidth among the bandwidths of the at least one UE.

Furthermore, in this specification, the determined number of specific subbands is determined as a value obtained by dividing the bandwidth of a UE supporting the greatest bandwidth, among the bandwidths of the at least one UE, by a bandwidth of the specific subband.

Furthermore, in this specification, the number of specific subbands is 2, and the aggregation level is 8.

Furthermore, in this specification, the at least one control resource set includes a first control resource set and a second control resource set, and the first control resource set is a fixed resource region.

Furthermore, in this specification, the at least one control resource set includes a plurality of CSSs, and a first CSS among the plurality of CSSs is included in an initial specific subband including a synchronization signal block (SSB).

Furthermore, in this specification, information on the first CSS is implicitly derived through a synchronization signal block.

Furthermore, this specification provides a monitoring method for a common search space (CSS) in a wireless communication system.

Specifically, the method performed by a user equipment (UE) includes transmitting, to a network, information on a bandwidth of the UE, receiving, from the network, configuration information for at least one CSS, and monitoring a physical control channel in the at least one CSS. The at least one CSS is configured by mapping a part of an aggregation level to each specific subband based on the number of specific subbands and the aggregation level of the CSS.

Furthermore, in this specification, the number of specific subbands is determined based on the specific subband and information on a bandwidth of at least one UE obtained by the network.

Furthermore, this specification provides a wireless device for configuring a common search space (CSS) in a wireless communication system.

Specifically, the wireless device include a radio frequency (RF) module for transmitting or receiving a radio signal and a processor functionally connected to the RF module. The processor is configured to obtain information on the bandwidth of at least one user equipment (UE) from the at least one UE, determine a specific subband indicating a unit of a bandwidth capable of communication with the UE, determine the number of specific subbands based on the determined specific subband and the obtained information on the bandwidth of the UE, and map a part of an aggregation level to each specific subband based on the determined number of specific subbands and the aggregation level of the CSS.

Advantageous Effects

This specification has an effect in that a radio resource can be efficiently used because a minimum subband is determined and a CSS is configured based on the number of minimum subbands and an aggregation level if UEs having a plurality of RF bands are present.

Effects which may be obtained in the present invention are not limited to the aforementioned effects, and various other effects may be evidently understood by those skilled in the art to which the present invention pertains from the following description.

DESCRIPTION OF DRAWINGS

The accompany drawings, which are included as part of the detailed description in order to help understanding of the present invention, provide embodiments of the present invention and describe the technical characteristics of the present invention along with the detailed description.

FIG. 1 is a diagram showing an example of an overall system structure of NR to which a method proposed in this specification may be applied.

FIG. 2 shows the relation between an uplink frame and a downlink frame in a wireless communication system to which a method proposed in this specification may be applied.

FIG. 3 shows an example of a resource grid supported in a wireless communication system to which a method proposed in this specification may be applied.

FIG. 4 shows an example of a self-contained subframe structure to which a method proposed in this specification may be applied.

FIG. 5 shows examples of a self-contained subframe structure to which a method proposed in this specification may be applied.

FIG. 6 is a diagram showing an example of a minimum subband within a system bandwidth to which a method proposed in this specification may be applied.

FIGS. 7a and 7b show examples of a method of mapping a CSS based on an aggregation level and the number of subbands, which is proposed in this specification.

FIG. 8 shows an example of a method of indexing CCEs based on the number of minimum subbands, which is proposed in this specification.

FIG. 9 is a diagram showing an example of a structure in which a plurality of CSSs is disposed in a system band, which is proposed in this specification.

FIG. 10 shows an example of an REG indexing method for a CSS, which is proposed in this specification.

FIG. 11 shows another example of an REG indexing method for a CSS, which is proposed in this specification.

FIG. 12 shows a CCE indexing method based on the number of subbands if an aggregation level is 4, which is proposed in this specification.

FIG. 13 shows another example of a CCE indexing method based on the number of subbands if an aggregation level is 4, which is proposed in this specification.

FIGS. 14a and 14b are diagrams showing other examples of a CCE indexing method proposed in this specification.

FIG. 15 shows an example of CSSs which may be monitored by UEs having various bandwidths if multiple subbands are configured, which is proposed in this specification.

FIG. 16 shows another example of CSSs which may be monitored by UEs having various bandwidths if multiple subbands are configured, which is proposed in this specification.

FIG. 17 is a flowchart showing an operation of a network for implementing method of configuring a common search space, which is proposed in this specification.

FIG. 18 is a flowchart showing an operation of a UE for monitoring a common search space, which is proposed in this specification.

FIG. 19 illustrates a block diagram of a wireless communication device to which methods proposed in this specification may be applied.

FIG. 20 illustrates a block diagram of a communication device according to an embodiment of the present invention.

MODE FOR INVENTION

In what follows, preferred embodiments of the present invention will be described in detail with reference to appended drawings. Detailed descriptions to be disclosed below with reference to the appended drawings are intended to describe illustrative embodiments of the present invention but are not intended to represent the sole embodiment of the present invention. Detailed descriptions below include specific details to provide complete understanding of the present invention. However, it should be understood by those skilled in the art that the present invention may be embodied without the specific details to be introduced.

In some cases, to avoid obscuring the gist of the present invention, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present invention, and the specific terms may be used in different ways as long as it does not leave the technical scope of the present invention.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The 5G NR defines enhanced Mobile Broadband (eMBB), massive Machine Type Communication (mMTC), Ultra-Reliable and Low Latency Communications (URLLC), and vehicle-to-everything (V2X) depending on usage scenarios.

And the 5G NR standard is divided into standalone (SA) and non-standalone (NSA) modes according to co-existence between the NR system and the LTE system.

And the 5G NR supports various subcarrier spacing and supports CP-OFDM for downlink transmission while CP-OFDM and DFT-s-OFDM (SC-OFDM) for uplink transmission.

The embodiments of the present invention may be supported by standard documents disclosed for at least one of wireless access systems such as the IEEE 802, 3GPP, and 3GPP2. In other words, those steps or portions among embodiments of the present invention not described to clearly illustrate the technical principles of the present invention may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present invention are not limited to the specific system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

Numerology: corresponds to one subcarrier spacing in the frequency domain. Different numerology may be defined by scaling reference subcarrier spacing by an integer N.

NR: NR Radio Access or New Radio

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_F)$. In this case, $\Delta f_{max} = 480 \cdot 10^3$, and $N_F = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, an UL frame number I from a user equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_s^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

TABLE 3

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | - | - | - |
| 4 | 12 | 160 | 16 | - | - | - |
| 5 | 12 | 320 | 32 | - | - | - |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 4, one resource grid may be configured for the numerology μ and an antenna port p.

FIG. 4 shows examples of resource ports of an antenna port and a ringer by which the method proposed in the present invention can be applied.

Each element of the resource grid for the numerology μ and the antenna port p is indicated as a resource element, and may be uniquely identified by an index pair (k,l̄). Herein, $k=0, \ldots, N_{RB}^\mu N_{sc}^{RB}-1$ is an index in the frequency domain, and $l̄=0, \ldots, 2^\mu N_{symb}^{(\mu)}-1$ indicates a location of a symbol in a subframe. To indicate a resource element in a slot, the index pair (k,l̄) is used. Herein, $l=0, \ldots, N_{symb}^\mu-1$.

The resource element (k,l̄) for the numerology μ and the antenna port p corresponds to a complex value $a_{k,l̄}^{(p,\mu)}$. When there is no risk of confusion or when a specific antenna port or numerology is specified, the indexes p and μ may be dropped and thereby the complex value may become $a_{k,l̄}^{(p)}$ or $a_{k,l̄}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^\mu-1$ in the frequency region.

Self-Contained Subframe Structure

A time division duplexing (TDD) structure taken into consideration in the NR system is a structure in which both the uplink (UL) and the downlink (DL) are process in one subframe. This is for minimizing latency of data transmission in the TDD system. The structure is called a self-contained subframe structure.

FIG. 4 shows an example of a self-contained subframe structure to which a method proposed in this specification may be applied. FIG. 2 is merely for convenience of description, and does not restrict the scope of the present invention.

Referring to FIG. 4, as in the case of legacy LTE, a case where one subframe is configured with 14 orthogonal frequency division multiplexing (OFDM) symbols is assumed.

In FIG. 4, a region 402 means a DL control region, and a region 404 means an UL control region. Furthermore, a region (i.e., region not having separate indication) except the region 402 and the region 404 may be used for the transmission of DL data or UL data.

That is, UL control information and DL control information are transmitted in a single self-contained subframe. In contrast, in the case of data, UL data or DL data are transmitted in a single self-contained subframe.

If the structure shown in FIG. 4 is used, downlink transmission and uplink transmission may be sequentially performed and the transmission of DL data and the reception of uplink ACK/NACK may be performed within a single self-contained subframe.

As a result, if an error of data transmission occurs, the time taken for the retransmission of data may be reduced. Accordingly, latency related to data forwarding can be minimized.

In a self-contained subframe structure, such as FIG. 4, there is a need for a time gap for a process for an eNodeB (eNB or gNB) and/or a terminal (or user equipment (UE)) to switch from a transmission mode to a reception mode or a process for an eNB and/or a UE to switch from the reception mode to the transmission mode. In relation to the time gap, if uplink transmission is performed after downlink transmission in the self-contained subframe, some OFDM symbol(s) may be configured as a guard period (GP).

Furthermore, in the NR system, various types of self contained subframe structures may be taken into consideration in addition to the structure shown in FIG. 4.

FIG. 5 shows examples of a self-contained subframe structure to which a method proposed in this specification may be applied. FIG. 3 is merely for convenience of description, and does not restrict the scope of the present invention.

As in (a) to (d) of FIG. 5, a self-contained subframe in the NR system may be configured with various combinations using a DL control region, a DL data region, a guard period (GP), an UL control region, and/or an UL data region as one unit.

Hereinafter, if UEs having various reception radio frequency (RF) bands are present in a wireless communication system, a common search space (CSS) configuration method for efficiently using a radio resource, which is proposed in this specification, is described specifically with reference to relevant drawings.

In this case, the UEs having various reception RF bands (or bandwidths (BWs)) mean that the bandwidths (BWs) supported by the respective UEs are various. The CSS indicates a resource region in which the UEs may receive a common PDCCH from a network.

Furthermore, the CSS is included in a control resource set. The control resource set may be configured in the RF band of each UE. A control resource set that may be configured to a maximum may be pre-defined.

A new radio access technology (RAT) has an object of using a bandwidth (BW) support by a network as much as possible.

However, a network may use a BW smaller than a supportable BW because a BW supported by a terminal (or UE) and a BW supported by the network are different.

In this case, the unit of a BW capable of communication between the network and the UE may be defined as a minimum subband, a bandwidth part (BWP), an NR subband, or a specific subband. FIG. 6 shows an example of a minimum subband.

That is, FIG. 6 is a diagram showing an example of a minimum subband within a system bandwidth to which a method proposed in this specification may be applied.

As shown in FIG. 6, if UEs (UE 1, UE 2, and UE 3) having various reception RF bands are present in a wireless communication system, a network may configure a minimum subband so that it can operate in the situation in which the state of the UEs are unaware.

From FIG. 6, it may be seen that the UE 1 has an RF band (or BW) corresponding to 4 NR subbands, the UE 2 has an RF band corresponding to 2 NR subbands, and the UE 3 has an RF band corresponding to 1 NR subband.

Furthermore, if most of UEs accessing a specific cell need to access the cell through a CSS, the easiest method of configuring, by a network, the CSS is to configure the CSS based on a US having a small RF band.

In this case, if the CSS is configured based on a UE having the smallest RF band, the control region of UEs having small RF bands may be insufficient, and the control region of UEs having relatively large RF bands may be left over.

As a result, the radio resource of a wireless communication system may be used inefficiently.

Hereinafter, a method of configuring a CSS (first embodiment) in order to efficiently use a radio resource in a wireless communication system and a method of indexing CCEs and REG in a control resource set (or control channel) (second embodiment) are described.

First Embodiment

The first embodiment relates to a method of mapping each part of a CSS aggregation level (AL) to each minimum subband based on the number of minimum subbands.

For example, if the number of minimum subbands is 4 and an AL is 4, each part of a CSS aggregation level is mapped to each minimum subband.

In FIGS. 7a and 7b, each grid indicates one control channel element (CCE).

Furthermore, it is assumed that a control resource set (CORESET) configured within each minimum subband is configured with N CCEs. In this case, N indicates a natural number.

In this specification, it is assumed that the number of CCEs included in each (minimum) subband is identically N and a system bandwidth is divided into minimum subbands having the same size, for convenience of description. In this case, the first embodiment may be applied to other situations, for example.

Furthermore, it is assumed that the CCE number may be applied based on a minimum subband among subbands.

That is, if (minimum) subbands have different numbers of CCEs, N may mean the CCE number of (minimum) subbands including the smallest number of CCEs, that is, a minimum value of a CCE between the (minimum) subbands.

For example, if an aggregation level is 4 in the system BW, as shown in FIG. 7a, it may be seen that a minimum subband is configured as the BW of a UE 3 and the location of a CSS is determined as the CCE index 0 of each minimum subband.

In the standpoint of a UE 1, the CSS has an aggregation level of 4. In the standpoint of a UE 2, the CSS has an aggregation level of 2. In the standpoint of the UE 3, the CSS has an aggregation level of 1.

More specifically, a bandwidth supported by a UE may be a nominal bandwidth and a smaller bandwidth than the nominal bandwidth.

If a nominal bandwidth and a bandwidth smaller than the nominal bandwidth are a wideband (e.g., nominal bandwidth=100 MHz, bandwidth smaller than the nominal bandwidth=20 MHz), a network may configure a CSS common to UEs.

However, if a nominal bandwidth approaches a minimum size necessary for the operation of a CSS or a network configures a CSS in the resource utilization aspect, a CSS resource set corresponding to the nominal bandwidth may be configured, and a partial AL may be configured through CCE indexing so that UEs having small bandwidths can access the partial AL.

If a UE having a small bandwidth has a coverage issue, the UE having the small bandwidth may not succeed in control channel detection.

In order to solve this, as in the methods shown in FIGS. 7a and 7b, if a CSS is distributed and mapped to the CCE of each minimum subband, the resource of each subband can be used efficiently.

That is, FIGS. 7a and 7b show examples of a method of mapping a CSS based on an aggregation level and the number of subbands, which is proposed in this specification.

Specifically, FIG. 7a shows a method of mapping a CSS if an aggregation level (AL) is 4, and FIG. 7b shows a method of mapping a CSS if an aggregation level is 8.

The CSS mapping methods shown in FIGS. 7a and 7b are described more specifically. First, the BW (nominal BW) of the UE 1 is divided into M blocks, and REG mapping is performed on each block.

Next, one CCE is configured by grouping M REGs having the same REG index in each block. That is, one CCE may be configured with M REGs.

Accordingly, M indicates the number of REGs configuring one CCE.

That is, in FIG. 7, it may be seen that 710 and 720 indicate CSSs, and a CSS is configured in one CCE (FIG. 7a) or two CCEs (FIG. 7b) of each minimum subband.

In FIG. 7a, it may be seen that one CCE is configured with 4 REGs having the same REG index and a CCE(s) corresponding to the CCE index 0 of each minimum subband is configured as a CSS.

Furthermore, FIG. 7b shows a case where an aggregation level is 8 in a system BW.

That is, in FIG. 7b, it may be seen that 2 CCEs (CCE index 0 and 1) are configured in each minimum subband for a CSS.

In order to effectively use the CSS mapping methods described in FIGS. 7a and 7b, the relation between the BWs of UEs may be a function for M.

For example, if M is 4, ½ of a nominal bandwidth or ¼ of a nominal bandwidth may be applied to the BWs of UEs other than a nominal bandwidth UE.

That is, if the BW of the UE 1 is a nominal bandwidth and M=4, the BW of a UE 2 is 2 (4*½), and the BW of a UE 3 is 1 (4*¼).

Alternatively, if M is 5, ⅕ of the nominal bandwidth or ½.5 of the nominal bandwidth may be applied to the BWs of UEs other than the nominal bandwidth UE.

In this case, the above-described methods may use resources efficiently, but performance of a UE having a low aggregation level may be degraded with respect to the detection of control information.

Accordingly, a network needs to properly adjust scheduling based on the channel state.

In order for a network to perform scheduling properly or efficiently, a CCE indexing method for the CCEs of each subband may be important. A detailed method of indexing CCEs is described later.

For another example, a method of using the search space of UEs having different BWs is to determine a candidate shared between nominal bandwidth UEs and small bandwidth UEs having bandwidths smaller than the nominal bandwidth, to enable a small bandwidth UE to monitor only the determined candidate, and to enable the nominal bandwidth UE to monitor candidates in different regions in addition to the determined candidate.

In this case, the candidate may indicate a resource (CCE, SS) in which a PDCCH may be transmitted/received.

FIG. 8 shows an example of a method of indexing CCEs based on the number of minimum subbands, which is proposed in this specification.

Referring to FIG. 8, in the CCE indexing method, first, CCE mapping is performed based on a nominal bandwidth (BW of a UE 1) (CCE indices 0, 1, . . . , 4-1).

Furthermore, a UE 2 may be configured to perform blind decoding (BD) on only candidates corresponding to the CCE indices 0-2N-1, a UE 3 may be configured to perform BD on only the CCE indices 0-N-1, and the UE 1 may be configured to perform BD on only the CCE indices 0-4N-1.

In FIG. 8, a slashed portion 810 indicates a CCE in which a CSS has been configured.

The CCE indexing method of FIG. 8 may be identically applied to a case where a UE supporting a nominal bandwidth receives a random access response (RAR) from a network between different search spaces or through a search space.

For example, assuming that a CSS is configured as a synchronization signal (SS) block or a minimum initial subband size before a network notifies a UE of a system bandwidth through a physical broadcast channel (PBCH) and/or a system information block (SIB) or before a network notifies a UE of information of a control resource set that may be applied to a nominal bandwidth, it may be assumed that the UE performs SIB, RAR, Msg4, common PDCCH transmission using only a candidate within the minimum initial subband.

"A and/or B" described in this specification may be interpreted identically with "at least one of A or B."

Thereafter, if a network becomes aware of the capability of a UE, the network may allocate more candidates to minimum subbands other than a minimum initial subband.

The number of candidates P1 corresponding to the minimum initial subband and the number of candidates P2 monitored in a different resource set (or a different minimum subband) other than the initial subband may be set differently.

If a UE is allocated with an additional resource from a network, monitoring may be performed on P1+P2 candidates.

Alternatively, a network may assume a nominal bandwidth in a PBCH and/or an SIB, and may allocate a resource to a UE.

Furthermore, a network may configure that a candidate belonging to a minimum initial subband size is used for SIB, RAR, Msg4, common PDCCH transmission for the purpose of a UE supporting only a minimum system bandwidth.

If a different search space or (control) resource set is different from a CSS for fallback in a search space (SS) in which an RAR is monitored and transmit power control (TPC), a resource set in which the RAR is monitored may be configured based on a minimum initial subband, and a wide different SS or resource set may be allocated.

That is, minimum BW UEs may receive all piece of information in the initial subband, and a wideband UE may receive information (SIB) to be first received in the initial subband, and may receive an RAR, Msg4, common PDCCH in a different subband.

Furthermore, the above contents may be different depending on how a network configures each SS or control resource set.

More generally, as in FIG. 9, it is assumed that several CSSs or several control resource sets may be configured within one system bandwidth.

FIG. 9 is a diagram showing an example of a structure in which a plurality of CSSs is disposed in a system band, which is proposed in this specification.

In FIG. 9, a CSS 1 may mean the time and/or frequency resource of a candidate corresponding to a common search space that may be monitored within a control resource set or may mean a control resource set.

Furthermore, a search space mapped to a control resource set and a radio network temporary identifier (RNTI) may be configured differently.

This may also be applied to the CSS 1 and a CSS 2 and may also be applied to the CSS 1 and a CSS 3.

That is, a different configuration may be applied to a case including different frequency bandwidths or between the control regions of different subbands.

In this case, a subband in which the transmission of a synchronization signal (SS) block for initial access is assumed is defined as an "anchor subband."

The SS block may be smaller than or equal to a minimum bandwidth or an initial minimum subband size.

Furthermore, a system bandwidth may be divided in a nominal bandwidth size, and the nominal bandwidth may be divided into minimum bandwidths.

In this case, the CSS 2 may be configured to be included in an initial subband.

In this case, cases corresponding to the CSS 2 may include an RAR, an SIB, Msg4, and a cell common signal as described above.

Alternatively, the cases corresponding to the CSS 2 may also be used for a group common search space or common search space purpose in a UE not including a nominal bandwidth, in addition to RAR, SIB, Msg4 transmission.

If the bandwidth of a UE is transmitted in a PRACH (in this case, it may be assumed that a RACH resource itself is differently allocated for each different bandwidth. For example, an RACH for a nominal bandwidth is allocated across a nominal bandwidth, and an RACH for a small bandwidth is allocated across a small bandwidth), the CSS 2 may be limited for only SIB transmission.

Furthermore, the transmission of an RAR may be performed across a different CSS based on the capability of a UE.

For example, a UE that has reported a small bandwidth may expect the reception of an RAR only in the CSS 2, and a UE that has not reported a small bandwidth may expect the reception of an RAR in the CSS 1 in addition to the CSS 2.

If a UE capability is transmitted in Msg3 or a network is already aware of the capability of a UE, the UE may expect transmission or reception is performed using the above method from Msg4.

Furthermore, information on the CSS 1 may be transmitted in a PBCH or may be transmitted in an SIB.

Furthermore, information on the CSS 2 may be implicitly derived from an SS block.

For example, the resource set of the CSS 2 may be the same as an SS block size on a frequency or may be the same as the number of physical resource blocks (PRBs) assumed as an initial subband size or the symbol number of a resource set may be notified or may be pre-defined in a PBCH.

If the numerology of a synchronization or SS block is different, it may be assumed that a basically assumed initial subband size has been fixed.

In this case, the basic numerology of the CSS 2 may follow a numerology fixed for each band or may be configured through transmission that complies with a cell broadcast channel, such as a PBCH or an SIB.

It may be assumed that information on the CSS 3 and the CSS 4 may be indicated when a UE moves to a different subband (a resource set configuration for the CSS 3 or the CSS 3 and the CSS 4 for each UE), or may be notified along with information of a different subband through a PBCH and/or an SIB or the same configuration as an anchor subband is applied to a different subband.

In this case, it may be assumed that mapping corresponding to a received configuration is valid within each subband and the same configuration is the same other than an absolute frequency location.

First, a UE having a nominal bandwidth (nominal BW UE) is described.

A nominal bandwidth UE needs to always monitor the candidate of the CSS 1 (or CSS 3).

That is, the nominal BW UE monitors a basic CSS configured therefor.

In this case, cell-common or subband-common data, such as an SIB, RAR or cell common signal, may be monitored only in the candidate of the CSS 2 (or CSS 4).

The nominal BW UE may obtain other signal or information by monitoring the candidate of the CSS 1 (or CSS 3).

That is, in general, the nominal BW UE monitors a basic CSS configured for the nominal BW UE, but may monitor a CSS configured for a small BW UE in order to reduce the number of BDs with respect to an operation related to a specific RNTI.

In this case, it may be assumed for the small BW UE, a network supports a CSS (CSS 2 or CSS 4) for fallback.

A DCI formats or RNTI set transmitted in the CSS for fallback may be limited. In general, the configurations of the following two methods (Method 1 and Method 2) may be possible.

Method 1 is a method of configuring a CSS (e.g., CSSs 1 and 3) for a nominal BW UE and implicitly deriving a CSS for fallback from an initial subband. In this case, it may be assumed that the CSS 2 or the CSS 4 is always present. Alternatively, the presence or absence of a CSS for fallback may be separately configured.

Next, Method 2 is a method of performing a configuration for each of the CSSs 1 and 2, or the CSSs 3 and 4. In Method 2, the CSS 2 or the CSS 4 may not be configured.

Furthermore, a UE or a group UE may be configured with a different number of BDs for each BW.

As described above, from the viewpoint of one UE BW, several CSS sets may be allocated, and a different number of BDs may be configured in each CSS set.

In this case, the REG-CCE configuration or mapping of each CSS set may take into consideration the following two options.

(Option 1)
Option 1 is a method of performing REG indexing so that the smallest set is nested.

(Option 2)
Option 2 is a method of performing REG indexing separately with respect to a region other than the smallest set.

FIGS. 10 and 11 show the methods of Option 1 and Option 2, respectively.

FIG. 10 shows that, assuming that the BW of a UE 3 having the smallest BW is 5 MHz, the BWs of a UE 2 and a UE 1 are 20 MHz and 100 MHz, respectively.

In FIG. 10, each minimum subband is 5 MHz and includes N REGs (or CCEs). For example, an REG number may be differently configured in each minimum subband.

Furthermore, in FIG. 10, a search space (SS) has been represented as being "located (or centralized)", but the SS may be represented as being distributed.

FIG. 10 shows Option 1. 0~a REGs (or CCE 1010) correspond to the smallest CSS set and a region in which all the UEs 1 to 3 perform detection. N~N+b REGs (or CCE 1020) correspond to a region in which the UE 2 and the UE 1 perform detection. 4N~4N+c REGs (or CCE, 1030) correspond to a region in which only the UE 1 perform detection.

Furthermore, if the number of BDs of UEs having a BW of 20 MHz is set to "20", 5 MHz among the 20 MHz, that is, the number of BDs to be performed in the smallest CSS set, may be set to "2", and the remaining 18 BDs may be performed in the 20 MHz band.

Alternatively, if the number of BDs of UEs having a BW of 100 MHz is set to "20", the number of BDs to be performed in the 5 MHz band may be set to "2", the number of BDs to be performed in the 20 MHz band may be set to "4", and the remaining 14 BDs may be performed in the 100 MHz band.

In this case, the BD performed in the 5 MHz band may be used for the above-described fallback message or may be used for an initial access process or common signaling transmission.

FIG. 10 shows an example of an REG indexing method for a CSS, which is proposed in this specification.

Furthermore, FIG. 11 shows Option 2.

In FIG. 11, as described in FIG. 10, a different number of BDs may be configured in UEs having various BWs.

In this case, a difference between FIGS. 10 and 11 is that from the standpoint of a UE 1 and a UE 2, REG (or CCE) indexing is started again in the remaining BW except 5 MHz, that is, the smallest set.

Referring to FIG. 11, CCE indexing from 0 to N−1 is performed on the BW of a UE 3 (1110). Thereafter, CCE indexing from 0 to 3N−1 is performed on the BW of the UE 2 again in a CCE (1120), and CCE indexing from 0 to 19N−1 is performed on the BW of the UE 3 (1130).

Such a process may be performed through a method of configuring, by a network, information depending on the environment and notifying UEs of the configured information.

That is, FIG. 11 shows another example of an REG indexing method for a CSS, which is proposed in this specification.

Next, in one UE standpoint, with respect to a UE supporting a bandwidth greater than a minimum bandwidth supported by a system, the configuration of a CSS may be configured to be identical or smaller than the minimum bandwidth or to be great if a minimum bandwidth UE is not present according to circumstances.

In order for a UE to well receive data or a signal transmitted in such a CSS even in the reconfiguration duration of the CSS, at least specific CCEs need to be configured to be included in the minimum bandwidth regardless of the resource set of the CSS.

The specific CCEs may be used for channel transmission, such as a reconfiguration or common PDCCH.

In order to support such a situation, when a UE is configured with a resource set for a CSS, the UE may be configured with a core or invariant resource region or a fixed resource region.

As described above, if a UE is configured with an invariant resource region from a network, the UE may take into consideration that it performs the following operation.

The first is to perform mapping on a different region within a subsequently configured resource set after REG-CCE mapping is first performed in an invariant resource (this may include that REG indexing is first performed in the invariant resource).

Invariant resources from CCE indices 0 to K are mapped according to such a method. Thereafter, the CCEs may be mapped to different regions.

If such a method is used, BD for the CSS of a UE may be divided into an invariant resource and other different resource.

For example, an invariant resource (or resource 1) and other different resource (or resource 2) may be divided 50% (or by half).

In this case, to divide the invariant resource and other different resource 50% using two methods, that is, a case where the hashing of the CSS starts at 0 and a case where it starts at K+1, may be taken into consideration.

That is, this may be interpreted as the same meaning as that the PDCCH of a specific aggregation level is divided by half and the divided levels are mapped to different resource sets.

The reason why a specific resource is divided by half as described above is as follows. In the case of ultra reliable low latency communication (URLLC), signal transmission requires high reliability. If one PDCCH is divided and spread and mapped in the frequency domain, reliability of signal transmission can be improved because a diversity gain can be obtained when a UE decodes a PDCCH.

Furthermore, to configure the different resource in addition to the invariant resource corresponds to UEs having relatively large BWs.

If information common to UEs is transmitted at locations (CSSs 1 or 3 of FIG. 9) not an invariant resource, UEs having small BWs can also used the invariant resource.

This can improve reception efficiency in the UE standpoint and can improve scheduling flexibility in a network.

The second is to configure two resource sets in a UE as described above.

One resource set corresponds to an invariant resource, and the other resource set may be a resource set not including an invariant.

In this case, BD may be divided into the two resource sets, and REG-CCE mapping may be performed for each resource set.

The third is to perform REG-CCE mapping on all configured resource sets.

In this case, BD may be divided with respect to an invariant resource and other different resource and configured in a UE.

A CCE to which the first REG belonging to the invariant resource belongs may be defined with respect to the invariant resource based on the start point of a hashing function, or a network may directly indicate a start CCE index.

When hashing is applied using such a CCE as the start, if an REG is present in a different resource other than the invariant resource, the UE may assume that the corresponding REG is rate-matched.

If rate-matched REGs are many as described above, the number of effective REGs is reduced.

Accordingly, an aggregation level within an invariant resource may be configured differently from a different resource region when BD is configured.

Alternatively, when a corresponding method is used, a DCI size may be reduced and used in the same AL.

If an invariant resource is configured as described above, several symbols may be necessary to map one PDCCH when a bandwidth is small. In this case, a phenomenon in which a CSS is mapped to several symbols may occur. This may restrict data mapping or DM-RS mapping.

Furthermore, such an invariant resource may not be necessary for each slot.

Accordingly, a slot to which an invariant resource is applied is limited to a slot in which a common RS for radio link management (RLM) is transmitted or to a subset of a specifically determined slot, or may be formed in alignment with an SS block or may be subject to additional restriction.

Second Embodiment

The second embodiment relates to a CCE indexing and REG indexing method.

Several CSSs 2 are not assumed for one CSS 1. Only one fallback CSS is assumed. The location of a corresponding CSS may be derived from an SS block or may be explicitly indicated.

Assuming that a total of N CCEs are present in each minimum subband and a total of S minimum subbands are present within a subband corresponding to one nominal bandwidth, CCE indexing may be designed using various methods. In this case, N and S are natural numbers.

Hereinafter, a subband is defined to have a nominal bandwidth, and a subband corresponding to a small bandwidth (or minimum bandwidth) is defined to be a minimum subband.

Various CCE indexing methods are described.

(Method 1)

Method 1 is method of indexing CCEs for each minimum subband. That is, each subband includes 0 ~N CCE indices.

(Method 2)

Method 2 is a method of performing CCE indexing by integrating all minimum subbands.

As in FIG. 12, it may be seen that CCE indexing are sequentially performed from the first of the first minimum subband to the last CCE of the last minimum subband.

Furthermore, FIG. 12 shows a CCE indexing method based on the number of subbands if an aggregation level is 4.

(Method 3)

Method 3 is a method of performing interleaved CCE indexing on minimum subbands.

As in FIG. 13, it may be seen that CCE indices within each minimum subband are interleaved like 0, 4, 8, etc.

FIG. 13 shows a CCE indexing method based on the number of subbands if an aggregation level is 4.

In summary, FIGS. 7, 12 and 13 illustrating the above methods show CCE indexing methods for a system BW having a total of 4 subbands.

Specifically, the CCE indexing for Method 1 can be aware through FIG. 7. That is, it may be seen that CCE indexing is identically performed from 0 to N for each minimum subband.

A network can perform scheduling efficiently using various CCE indexing methods, such as Method 1 to Method 3.

In FIGS. 12 to 14, a slashed portion 1210, 1310, 1410 shows CCEs in which a CSS is configured.

In the above CCE indexing methods, CCE indexing may be differently configured from the viewpoint of UEs. That is, the CCE indexing may be divided into two cases as follows.

In the first, a narrow band UE and a wider band UE use CCE indexing based on its own criterion.

In this case, CCE indices may be differently interleaved in the wider band UE according to an AL.

The second is to use the same CCE indexing based on a wider band UE.

In this case, a network may notify a narrow band UE of a search space hashing gap. This may be confirmed through FIG. 14.

Two UEs are present in a system, and a network transmits a CSS in an aggregation level 4.

In this case, a UE 2 receives the CSS in an AL 2, and a UE 1 receives the CSS in the AL 4.

According to the first method, the narrow band UE 2 has CCE indexing, such as FIG. 14a, and detects the CSS in the CCE 0 and CCE 1 in the AL 2.

The wider band UE 1 has CCE indexing, such as FIG. 14b, regardless of the UE 2, and detects the CSS in the CCEs 0 to 3 in the AL 4.

If a network allocates fixed CCE indexing to UEs using the second method, it may configure the fixed CCE index based on the wider band UE 1.

In this case, the UE 1 detects the CSS using the above-described method, and notifies the narrow band UE of a search space hashing gap.

That is, referring to FIG. 14b, the UE 2 detects the CSS in the AL 2, and a hashing gap is set to "2."

FIGS. 14a and 14b are diagrams showing other examples of a CCE indexing method proposed in this specification.

Next, an REG indexing method is described.

The above-described CCE indexing method may be identically applied to an REG indexing method.

In the case of localized (or centralized), each CCE or candidate may be mapped to contiguous REGs. In the case of distributed, each CCE or candidate may be mapped by taking the following two methods into consideration.

Method 1 is a method of distributing and selecting REGs or CCEs within all subbands or within a resource corresponding to a CSS 1.

If Method 1 is used, when one candidate is out of a region with respect to a minimum subband, a small bandwidth UE assumes that it does not monitor the corresponding candidate.

Method 2 is a method of distributing and selecting REGs or CCEs within a minimum subband or a resource corresponding to the CSS 2 or distributing and selecting REGs or CCEs within a region except a minimum subband in a subband or within a resource except a resource corresponding to the CSS 2 in the CSS 1.

For example, assuming that the CCE mapping of Method 2 is used, when a candidate is produced if an AL is "4", a CCE index may be set as (0, N/4, 2*N/4, 3*N/4) or may be set as (N, N/4+N, 2*N/4+N, 3*N/4+N) in the candidate.

Although a fallback CSS comes in the middle, an REG configuration may start from the fallback CSS.

After the configuration of the fallback CSS is terminated, mapping may be performed based on frequency, time information.

A candidate may be configured so that it is not placed between a minimum subband and a subband through such a method.

FIGS. 15 and 16 show examples of CSSs which may be monitored by UEs having various BWs if multiple subbands are configured in a system.

In the subband of each UE, grids 1510 and 1610 show that CSSs have been mapped.

In this case, a system aggregation level may be 4 or 8.

FIGS. 15 and 16 show examples of a CSS mapping method, which is proposed in this specification.

Specifically, FIG. 15 shows a CSS mapping method if an AL is 4, and FIG. 16 shows a CSS mapping method if an AL is 8.

FIG. 17 is a flowchart showing an operation of a network for implementing method of configuring a common search space, which is proposed in this specification.

That is, FIG. 17 shows an operation method of a network in an overall viewpoint, which may include the contents described in the first embodiment and the second embodiment.

First, the network obtains information on the bandwidth of at least one UE from the at least one UE (S1710). The network may be interpreted as the same meaning as an eNB.

Thereafter, the network determines a specific subband indicative of a unit of a bandwidth capable of communication with the UE (S1720).

The specific subband may correspond to the bandwidth of the UE, supporting the smallest bandwidth among the bandwidths of the at least one UE.

Thereafter, the network determines the number of specific subbands based on the determined specific subband and the obtained information the bandwidth of the UE (S1730).

The determined number of specific subbands may be determined as a value obtained by dividing the bandwidth of the UE supporting the greatest bandwidth, among the bandwidths of the at least one UE, by the bandwidth of the specific subband.

The determined number of specific subbands is used for a CSS configuration included in a control resource set.

Thereafter, the network configures a CSS by mapping a part of an aggregation level to each specific subband based on the determined number of specific subbands and the aggregation level (S1740).

The part of the aggregation level may be mapped to a specific control channel element (CCE) of each specific subband.

The specific CCE may be one CCE or two CCEs.

For example, the number of specific subbands may be 2, and the aggregation level may be 8. In this case, the number of CCEs included in a CSS configured in each specific subband may be 4, and the 4 CCEs may be contiguously disposed or may be discontiguously disposed.

Additionally, the network may allocate at least one control resource set to the at least one UE. In this case, the at least one resource set includes at least one CSS.

Furthermore, the network may configure a different CSS for each control resource set.

In this case, resource element group (REG)-control channel element (CCE) mapping may be performed for each control resource set.

The at least one control resource set may include a first control resource set and a second control resource set.

In this case, the first control resource set may be defined as a fixed resource region.

Furthermore, the at least one control resource set may include a plurality of CSSs.

In this case, the first CSS, that is, one of the plurality of CSSs, may be included in an initial specific subband including a synchronization signal block (SSB).

In this case, information on the first CSS may be implicitly derived through the synchronization signal block.

FIG. 18 is a flowchart showing an operation of a UE for monitoring a common search space, which is proposed in this specification.

That is, FIG. 18 shows an operation method of a UE from an overall viewpoint, which may include the contents described in the first embodiment and the second embodiment.

First, the UE transmits information on its own bandwidth to a network (S1810). Likewise, the network may be interpreted as the same meaning as an eNB.

Thereafter, the UE receive configuration information for at least one CSS from the network (S1820).

Thereafter, the UE monitors a physical control channel in the at least one CSS (S1830).

The at least one CSS may be configured as part of an aggregation level is mapped to each specific subband based on the number of specific subbands and the aggregation level.

The specific subband may indicate a unit of a bandwidth capable of communication with the network.

In this case, the physical control channel may be a physical downlink control channel (PDCCH).

Furthermore, the number of specific subbands may be determined based on the specific subband and information on the bandwidth of at least one UE obtained by the network.

Furthermore, the at least one CSS may be included in at least one control resource set, and a different CSS may be configured for each control resource set.

Furthermore, resource element group (REG)-control channel element (CCE) mapping may be performed for each control resource set.

General Apparatus to which the Present Invention May be Applied

FIG. 19 illustrates a block diagram of a wireless communication device to which methods proposed in this specification may be applied.

Referring to FIG. 19, a wireless communication system includes an eNB 1910 and a plurality of UEs 1920 disposed within the area of the eNB 1910.

The eNB and the UE may be represented as wireless devices.

The eNB 1910 includes a processor 1911, a memory 1912 and a radio frequency (RF) unit 1913. The processor 1911 implements the function, process and/or method proposed in FIGS. 1 to 18. The layers of a radio interface protocol may be implemented by the processor 1911. The memory 1912 is connected to the processor 1911, and stores various pieces of information for driving the processor 1911. The RF unit 1913 is connected to the processor 1911, and transmits and/or receives a radio signal.

The UE 1920 includes a processor 1921, a memory 1922 and an RF unit 1923.

The processor 1921 implements the function, process and/or method proposed in FIGS. 1 to 18. The layers of a radio interface protocol may be implemented by the processor 1921. The memory 1922 is connected to the processor 1921, and stores various pieces of information for driving the processor 1921. The RF unit 1923 is connected to the processor 1921, and transmits and/or receives a radio signal.

The memory 1912, 1922 may be positioned inside or outside the processor 1911, 1921 and may be connected to the processor 1911, 1921 by various well-known means.

FIG. 20 illustrates a block diagram of a communication device according to an embodiment of the present invention.

Particularly, FIG. 20 is a diagram illustrating the UE of FIG. 19 more specifically.

Referring to FIG. 20, the UE may include a processor (or digital signal processor (DSP)) 2010, an RF module (or RF unit) 2035, a power management module 2005, an antenna 2040, a battery 2055, a display 2015, a keypad 2020, a memory 2030, a subscriber identification module (SIM) card 2025 (this element is optional), a speaker 2045, and a microphone 2050. The UE may further include a single antenna or multiple antennas.

The processor 2010 implements the function, process and/or method proposed in FIGS. 1 to 18. The layers of a radio interface protocol may be implemented by the processor 2010.

The memory 2030 is connected to the processor 2010, and stores information related to the operation of the processor 2010. The memory 2030 may be positioned inside or outside the processor 2010 and may be connected to the processor 2010 by various well-known means.

A user inputs command information, such as a telephone number, by pressing (or touching) a button of the keypad 2020 or through voice activation using the microphone 2050, for example. The processor 2010 receives such command information and performs processing so that a proper function, such as making a phone call to the telephone number, is performed. Operational data may be extracted from the SIM card 2025 or the memory 2030. Furthermore, the processor 2010 may display command information or driving information on the display 2015 for user recognition or convenience.

The RF module 2035 is connected to the processor 2010 and transmits and/or receives RF signals. The processor 2010 delivers command information to the RF module 2035 so that the RF module 2035 transmits a radio signal that forms voice communication data, for example, in order to initiate communication. The RF module 2035 includes a receiver and a transmitter in order to receive and transmit radio signals. The antenna 2040 functions to transmit and receive radio signals. When a radio signal is received, the RF module 2035 delivers the radio signal so that it is processed by the processor 2010, and may convert the signal into a baseband. The processed signal may be converted into audible or readable information output through the speaker 2045.

In the above-described embodiments, the elements and characteristics of the present invention have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the above-described functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The methods of transmitting an UL control channel in a wireless communication system according to the present invention have been described based on an example applied to the 3GPP LTE/LTE-A system, 5G system (New RAT system), but may be applied to various wireless communication systems in addition to the 3GPP LTE/LTE-A system, 5G system (New RAT system).

The invention claimed is:

1. A method of configuring a common search space (CSS) in a wireless communication system, the method performed by a network and comprising:
   obtaining, from a plurality of user equipment (UEs), information on a bandwidth for each of the plurality of UEs;
   determining a subband which is a unit of bandwidth capable of supporting communication with the plurality of UEs;
   determining a number of subbands based on the determined subband and a system bandwidth; and
   mapping each of a number of resource element groups (REGs) of control channel elements (CCEs) of the CSS to a different one of the determined number of subbands based on the determined number of subbands and an aggregation level of the CSS for the system bandwidth,
   wherein based on the plurality of UEs supporting various bandwidths, the determined subband is a smallest bandwidth among the various bandwidths,
   wherein the REGs are indexed for each of the subbands,
   wherein each of the CCEs is configured with the REGs having the same index, and
   wherein an aggregation level of the CSS for each of the plurality of UEs is determined differently based on a corresponding bandwidth of each of the plurality of UEs.

2. The method of claim 1, further comprising:
   allocating at least one control resource set to each of the plurality of UEs; and
   configuring a different CSS for each control resource set.

3. The method of claim 2, wherein resource element group (REG)-control channel element (CCE) mapping is performed for each control resource set.

4. The method of claim 1,
wherein the determined number of subbands is 2, and
wherein the aggregation level is 8.

5. The method of claim 2,
wherein the at least one control resource set comprises a first control resource set and a second control resource set, and
wherein the first control resource set is a fixed resource region.

6. The method of claim 2,
wherein the at least one control resource set comprises a plurality of CSSs, and
wherein a first CSS among the plurality of CSSs is included in an initial subband comprising a synchronization signal block (SSB).

7. The method of claim 6, wherein information on the first CSS is implicitly derived through a synchronization signal block.

8. A monitoring method for a common search space (CSS) in a wireless communication system, the method performed by a user equipment (UE) and comprising:
transmitting, to a network, information on a bandwidth of the UE;
receiving, from the network, configuration information for at least one CSS; and
monitoring a physical control channel in the at least one CSS,
wherein the at least one CSS is configured by mapping each of a number of resource element groups (REGs) of control channel elements (CCEs) of the CSS to a different corresponding subband based on a number of subbands and an aggregation level of the CSS for a system bandwidth,
wherein a given subband is a unit of bandwidth capable of supporting communication with the network,
wherein the number of subbands is determined based on the subband and the system bandwidth,
wherein based on a plurality of UEs supporting various bandwidths, the subband is a smallest bandwidth among the various bandwidths,
wherein the REGs are indexed for each of the subbands,
wherein each of the CCEs is configured with the REGs having the same index, and
wherein an aggregation level of the CSS for each of the plurality of UEs is determined differently based on a corresponding bandwidth of each of the plurality of UEs.

9. The method of claim 8,
wherein the at least one CSS is included in a control resource set, and
wherein a different CSS is configured for each control resource set.

10. The method of claim 9, wherein resource element group (REG)-control channel element (CCE) mapping is performed for each control resource set.

11. A wireless device for configuring a common search space (CSS) in a wireless communication system, the wireless device comprising:
a transmitter and receiver for transmitting or receiving a radio signal; and
a processor functionally connected to the transmitter and receiver,
wherein the processor is configured to:
obtain, from a plurality of user equipment (UEs), information on a bandwidth for each of the plurality of UEs;
determine a subband which is a unit of bandwidth capable of supporting communication with the plurality of UEs;
determine a number of subbands based on the determined subband and a system bandwidth; and
map each of a number of resource element groups (REGs) of control channel elements (CCEs) of the CSS to each a different one of the determined number of subbands based on the determined number of subbands and an aggregation level of the CSS for the system bandwidth,
wherein based on the plurality of UEs supporting various bandwidths, the determined subband is a smallest bandwidth among the various bandwidths,
wherein the REGs are indexed for each of the subbands,
wherein each of the CCEs is configured with the REGs having the same index, and
wherein an aggregation level of the CSS for each of the plurality of UEs is determined differently based on a corresponding bandwidth of each of the plurality of UEs.

12. A wireless device for monitoring a common search space (CSS) in a wireless communication system, the wireless device comprising:
a transmitter and receiver for transmitting and receiving a radio signal; and
a processor functionally connected to the transmitter and receiver,
wherein the processor is configured to:
transmit, to a network, information on a bandwidth of the UE;
receive, from the network, configuration information for at least one CSS; and
monitor a physical control channel in the at least one CSS,
wherein the at least one CSS is configured by mapping each of a number of resource element groups (REGs) of control channel elements (CCEs) of the CSS to a different corresponding subband based on a number of subbands and an aggregation level of the CSS for a system bandwidth,
wherein a given subband is a unit of bandwidth capable of supporting communication with the network,
wherein the number of subbands is determined based on the subband and the system bandwidth,
wherein based on a plurality of UEs supporting various bandwidths, the subband is a smallest bandwidth among the various bandwidths,
wherein the REGs are indexed for each of the subbands,
wherein each of the CCEs is configured with the REGs having the same index, and
wherein an aggregation level of the CSS for each of the plurality of UEs is determined differently based on a corresponding bandwidth of each of the plurality of UEs.

* * * * *